(12) United States Patent
Guy (10) Patent No.: US 6,394,465 B1
(45) Date of Patent: May 28, 2002

(54) CLAMPING DEVICE

(75) Inventor: Hanoch Guy, Petach Tikva (IL)

(73) Assignee: E.T.M. Precision Tools Manufacturing, Ltd., Tefen (IL)

( * ) Notice: Subject to any disclaimer, the term of this patent is extended or adjusted under 35 U.S.C. 154(b) by 0 days.

(21) Appl. No.: 09/463,785

(22) PCT Filed: Aug. 28, 1998

(86) PCT No.: PCT/IL98/00418

§ 371 (c)(1),
(2), (4) Date: Apr. 20, 2000

(87) PCT Pub. No.: WO99/11412

PCT Pub. Date: Mar. 11, 1999

(30) Foreign Application Priority Data

Aug. 28, 1997 (IL) .......................................... IL 121645

(51) Int. Cl.$^7$ ............................................. B23B 31/107
(52) U.S. Cl. .......................... 279/9.1; 279/76; 279/83; 409/234; 403/361; 403/362
(58) Field of Search ................. 279/9.1, 76, 77, 279/83, 87, 93–95; 409/234; 82/160; 403/361, 362

(56) References Cited

U.S. PATENT DOCUMENTS 1,003,369 A * 9/1911 Peterson et al. .............. 279/77

FOREIGN PATENT DOCUMENTS

| DE | 2043855 A | * 3/1972 | .................. 279/87 |
|---|---|---|---|
| DE | 2327968 | 12/1974 | |
| DE | 3205088 | 8/1983 | |
| DE | 88 13 889 | 8/1989 | |
| EP | 111787 | 6/1984 | |
| EP | 145985 A2 | * 6/1985 | .................. 279/83 |
| EP | 525560 | 2/1993 | |
| JP | 59-59303 | 4/1984 | |

OTHER PUBLICATIONS

Patent Abstracts of Japan, vol. 8, No. 164 (M–313), Jul. 28, 1984 & JP 59 059303.

* cited by examiner

*Primary Examiner*—Steven C. Bishop
(74) *Attorney, Agent, or Firm*—Pennie & Edmonds LLP (57) ABSTRACT

A clamping device (1, 25, 35) for releasably clamping an insertion member (9, 27, 38) with a shank portion, the clamping device comprising a clamping member having an insertion bore (11, 26, 40) formed by the union of an access bore portion (19A, 31A, 41A) and a gripping bore portion (19B, 31B, 41B) for the free sliding insertion into and withdrawal from the shank portion in respect of the access bore portion and its clamping by a clamping surface of the gripping bore portion on its forced displacement thereinto from the access bore portion, the access and gripping bore portions having longitudinal axes (20A, 20B; 32A, 32B; 43A, 43B) spaced apart at least along a portion thereof.

19 Claims, 10 Drawing Sheets

CLAMPING DEVICE

FIELD OF THE INVENTION

The invention relates to clamping devices for releasably clamping an insertion member.

BACKGROUND OF THE INVENTION

A common application of clamping devices is the releasable clamping of a cutting tool (constituting an insertion member) in a toolholder (constituting a clamping device). In JP Unexamined Patent Publication 7-9212, there is illustrated and described a side lock toolholder having an insertion bore formed by the union of an access bore portion and a gripping bore portion, the access bore portion and the gripping bore portion sharing a common longitudinal axis and respectively having, a radius r' and a radius r where r'>R>r and R is the radius of a cutting tool's right circular cylindrical shank. The access bore portion extends over an arc angle of almost 180° such that the cutting tool is freely slidingly insertable thereinto and withdrawable therefrom, the cutting tool being forcibly displaceable from the access bore portion to the gripping bore portion. Such a toolholder has a disadvantage that the arc angle of the gripping bore portion is less than 180° which reduces the gripping capability of the gripping bore portion which impairs stability during a cutting operation.

SUMMARY OF THE INVENTION

In accordance with the present invention, there is provided a clamping device for releasably clamping an insertion member, the clamping device comprising a clamping member having an insertion bore formed by the union of an access bore portion and a gripping bore portion for the free sliding insertion into and withdrawal from of the shank portion in respect of said access bore portion and its clamping by a clamping surface of said gripping bore portion on its forced displacement thereinto from said access bore portion characterized in said access and gripping bore portions having longitudinal axes spaced apart at least along a portion thereof.

In accordance with a first mode of implementation of the present invention, an insertion bore can be formed by the union of a pair of circular cross section access and gripping bore portions respectively having longitudinal axes which are parallel and offset one from another whereby an insertion member is sideways forcibly displaced from its access bore portion to its gripping bore portion. Preferably, an access bore portion has a right circular cylindrical shape whilst a gripping bore portion can have either a right circular cylindrical shape or a right circular frusto-conical shape.

In accordance with a second mode of implementation of the present invention, an insertion bore can be formed by the union of a pair of circular cross section access and gripping bore portions respectively having longitudinal axes which are intersecting whereby an insertion member is pivotally forcibly displaced from its access bore portion into its gripping bore portion. Preferably, an access bore portion has an inclined circular cylindrical shape whilst an gripping bore portion has a right circular cylindrical shape.

In both modes of implementation, the access bore portion has a diameter $D_1$ whose minimum value is greater than the diameter $D_0$ of an insertion members shank portion whilst the gripping bore portion has a maximum value $D_2$ which is less than $D_0$. In addition, in the former mode of implementation, the two longitudinal axes are spaced apart at a distance $D_3$ whilst in the latter mode of implementation, the two longitudinal axes are inclined at an inclination angle $\gamma$.

BRIEF DESCRIPTION OF THE DRAWINGS

In order to understand the invention and how it is used, preferred embodiments will now be described by way of non-limiting examples only, with reference to the accompanying drawing in which.

DETAILED DESCRIPTION OF PREFERRED EMBODIMENTS

Figure 1:
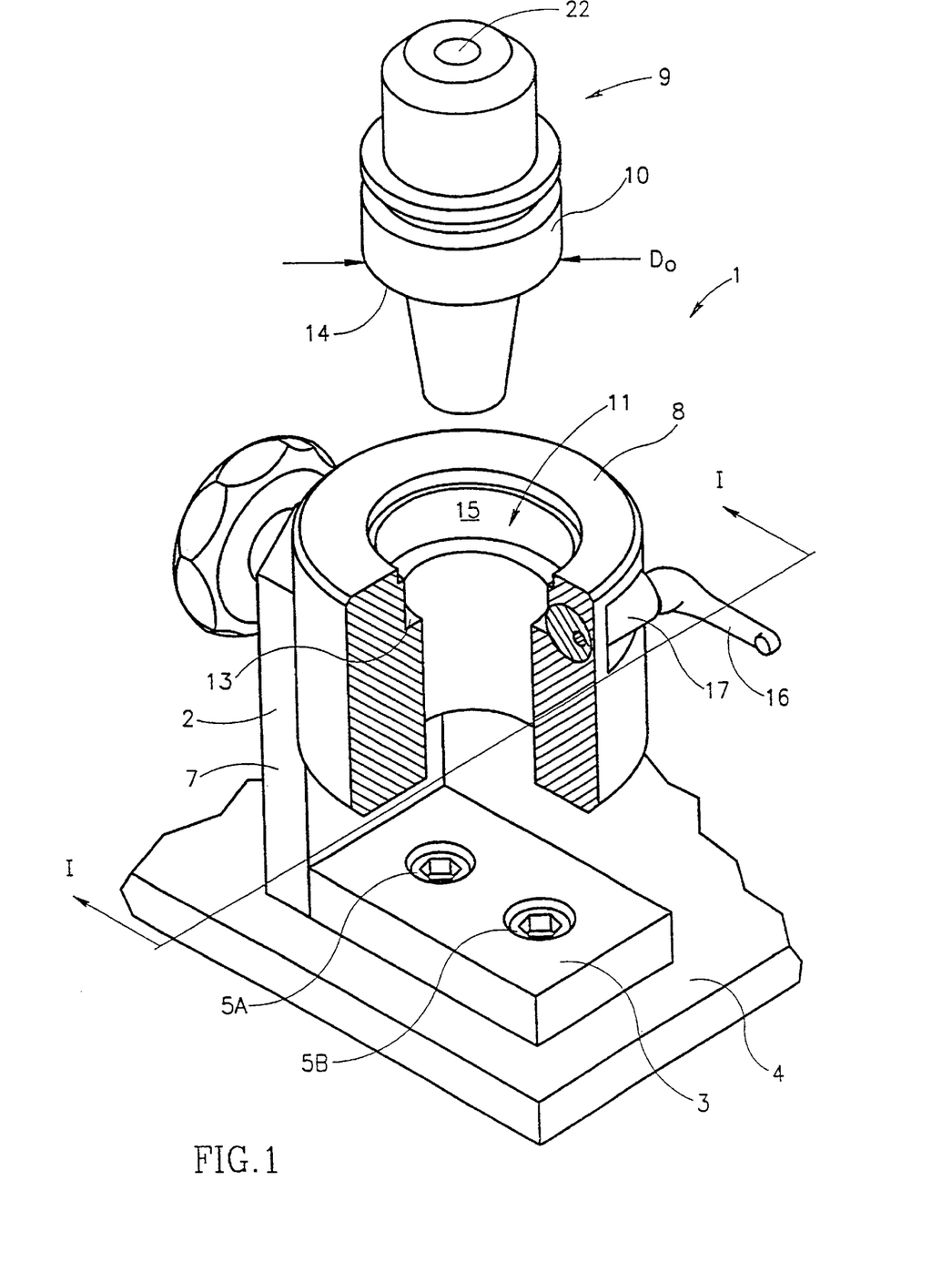
FIG. 1 is a partially cut-away perspective view of a toolholder clamp fixture for releasably clamping a toolholder.
Figure 2:
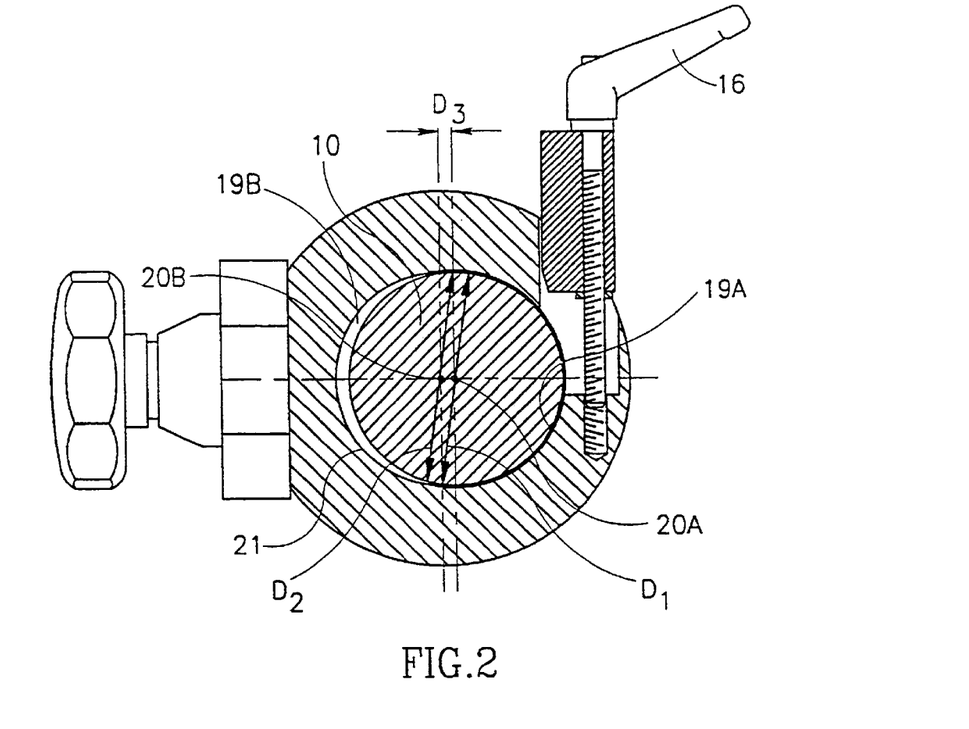
FIGS. 2 and 3 are respectively transverse cross sectional views of the toolholder clamp fixture along a line I—I in FIG. 1 showing a toolholder in its initial insertion and subsequent clamped positions.
Figure 3:
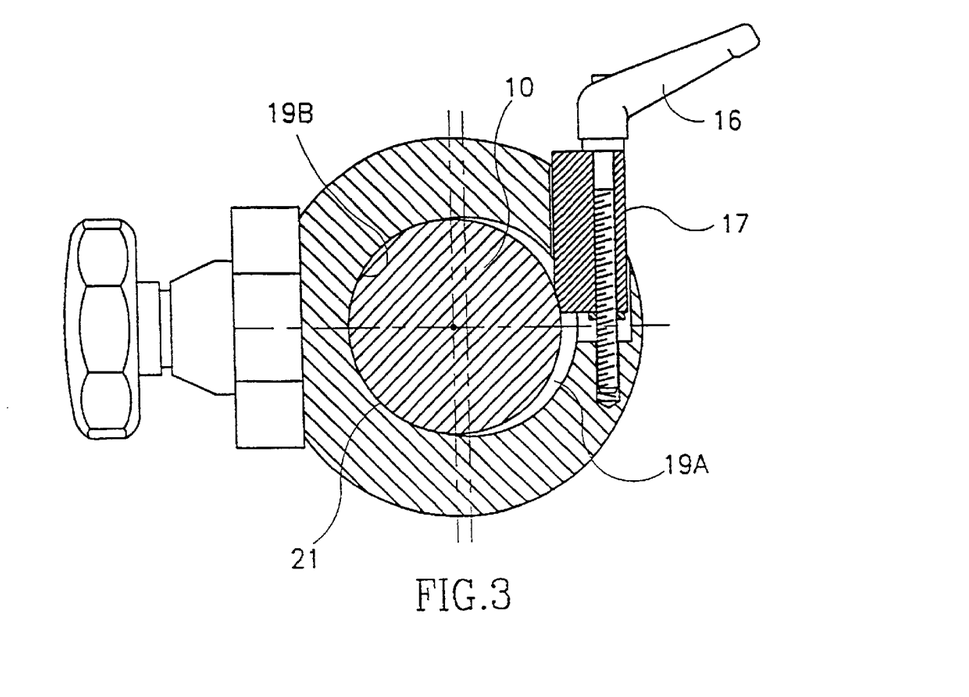

In FIGS. 1–3, a toolholder clamp fixture 1 (constituting a clamping device) includes an L-shaped mounting fame 2 having a horizontal mounting member 3 adapted for mounting the toolholder clamp fixture 1 on a workbench 4 by means of a pair of mounting screws 5A and 5B and an upright support 7 on which is mounted a toolholder clamp 8. The toolholder clamp 8 is adapted for releasably clamping a toolholder 9 (constituting an insertion member) which can be any one of a wide range of different types of toolholders, for example, an HSK-type toolholder, having a right circular cylindrical shank portion 10 of diameter $D_0$. The toolholder clamp 8 has an insertion bore 11 formed with an intermediate support shoulder 13 on which rests a lower abutment surface 14 of the shank portion 10. The toolholder 9 is secured in an upper holding portion 15 of the insertion bore 11 atop the support shoulder 13 by means of a securing device 16 having a sleeve 17 for bearing against the shank portion 10.

As shown in FIGS. 2 and 3, the upper holding portion 15 is formed by the union of right circular cylindrical access and gripping bore portions 19A and 19B respectively adjacent and remote from the securing device 16. The access and gripping bore portions 19A and 19B respectively have diameters $D_1$ and $D_2$ and parallel longitudinal axes 20A and 20B offset one from the other by an offset distance $D_3$. The inner surfaces of the access and gripping bore portions 19A and 19B intersect at junction lines (not shown) delimiting a generally semi cylindrical clamping surface 21 of the gripping bore portion 19B having an arc angle greater than 180°.

In use, the securing device 16 is initially screwed outwardly from the toolholder clamp 8 such that the toolholders shank portion 10 can be readily slidingly inserted into its access bore portion 19A (see FIG. 2). Thereafter, the securing device 16 is screwed into the toolholder clamp 8 such that its sleeve 17 presses against the toolholders shank portion 10 whereby it is clampingly received by the gripping bore portion 19B on its forced expansion. Once clamped, a new cutting tool can be clamped into the toolholders cutting tool receiving bore 22 or, alternatively, a worn cutting tool can be replaced. Finally, the securing device 16 is screwed outwardly and the toolholder 9 is manually forced back into the access bore portion 19A from which it can be readily slidingly withdrawn. Passage back into the access bore portion 19A is typically evidenced by a click as the toolholder 9 passes past the junction lines between the access and gripping bore portions 19A and 19B.

Figure 4:
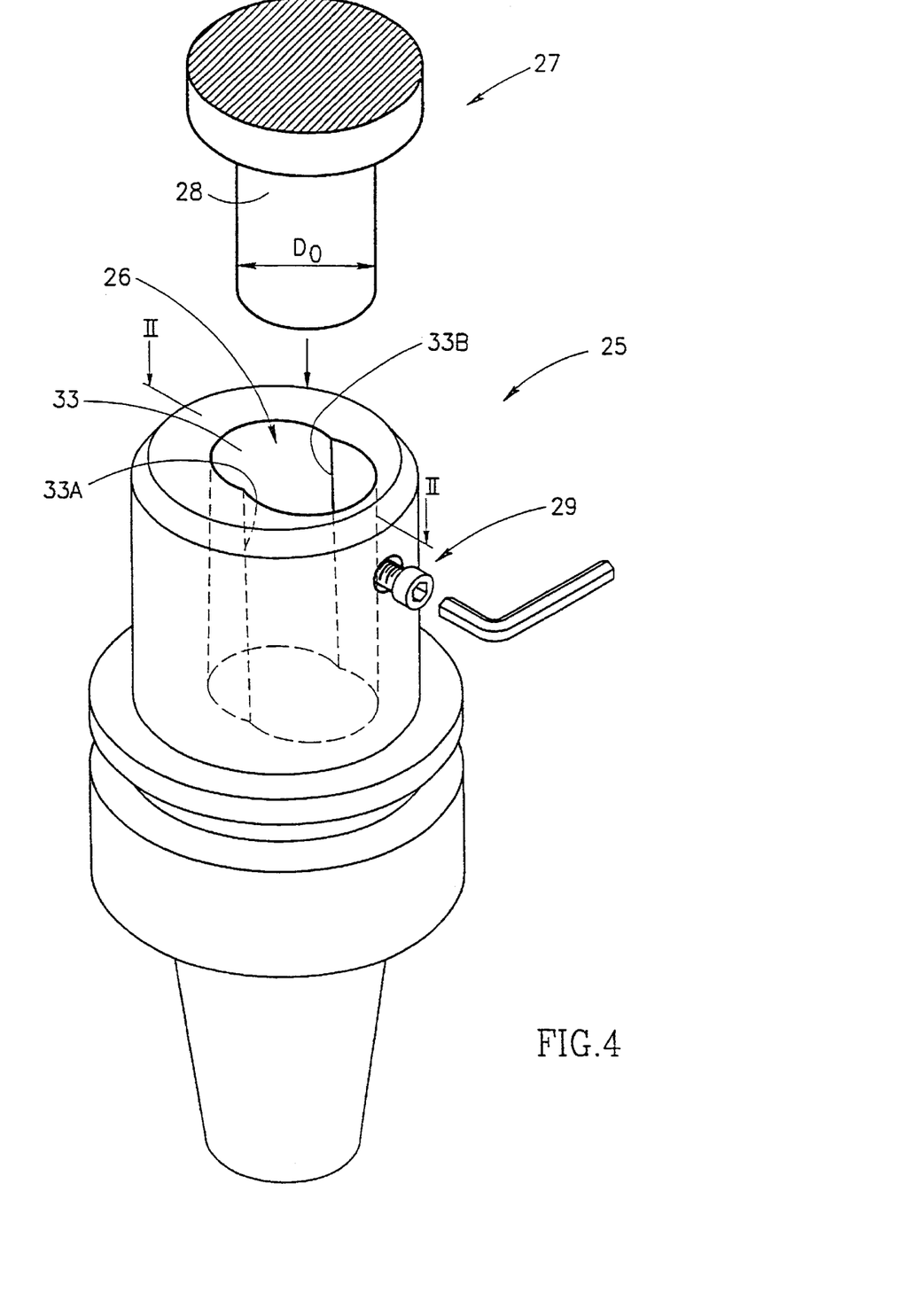
FIG. 4 is a perspective view of a toolholder for releasably clamping a cutting tool.
Figure 5:
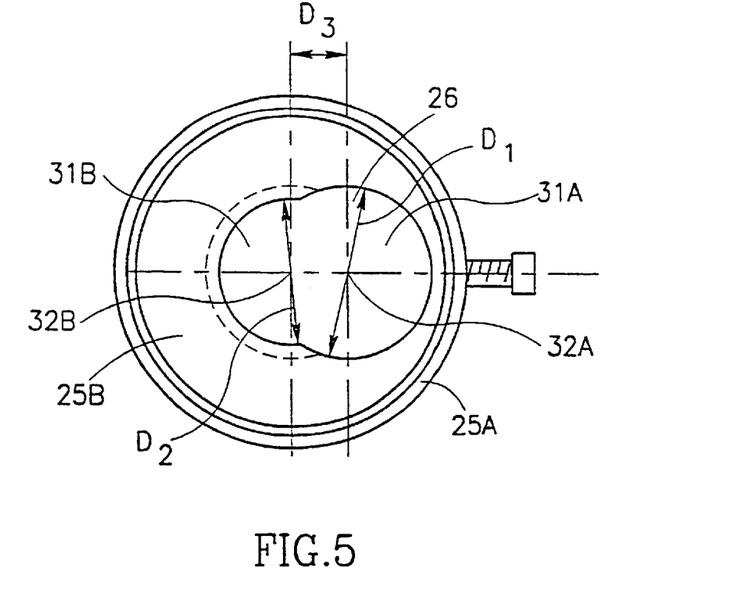
FIG. 5 is a top view of the toolholder of FIG. 4.
Figure 6:
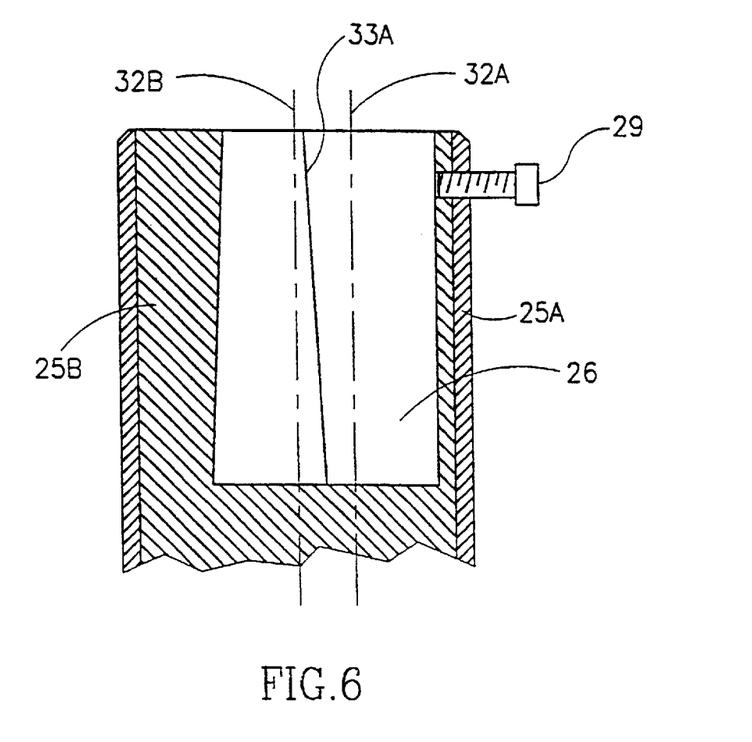
FIG. 6 is a longitudinal cross sectional view of the toolholder along a line II—II in FIG. 4.
Figure 7:
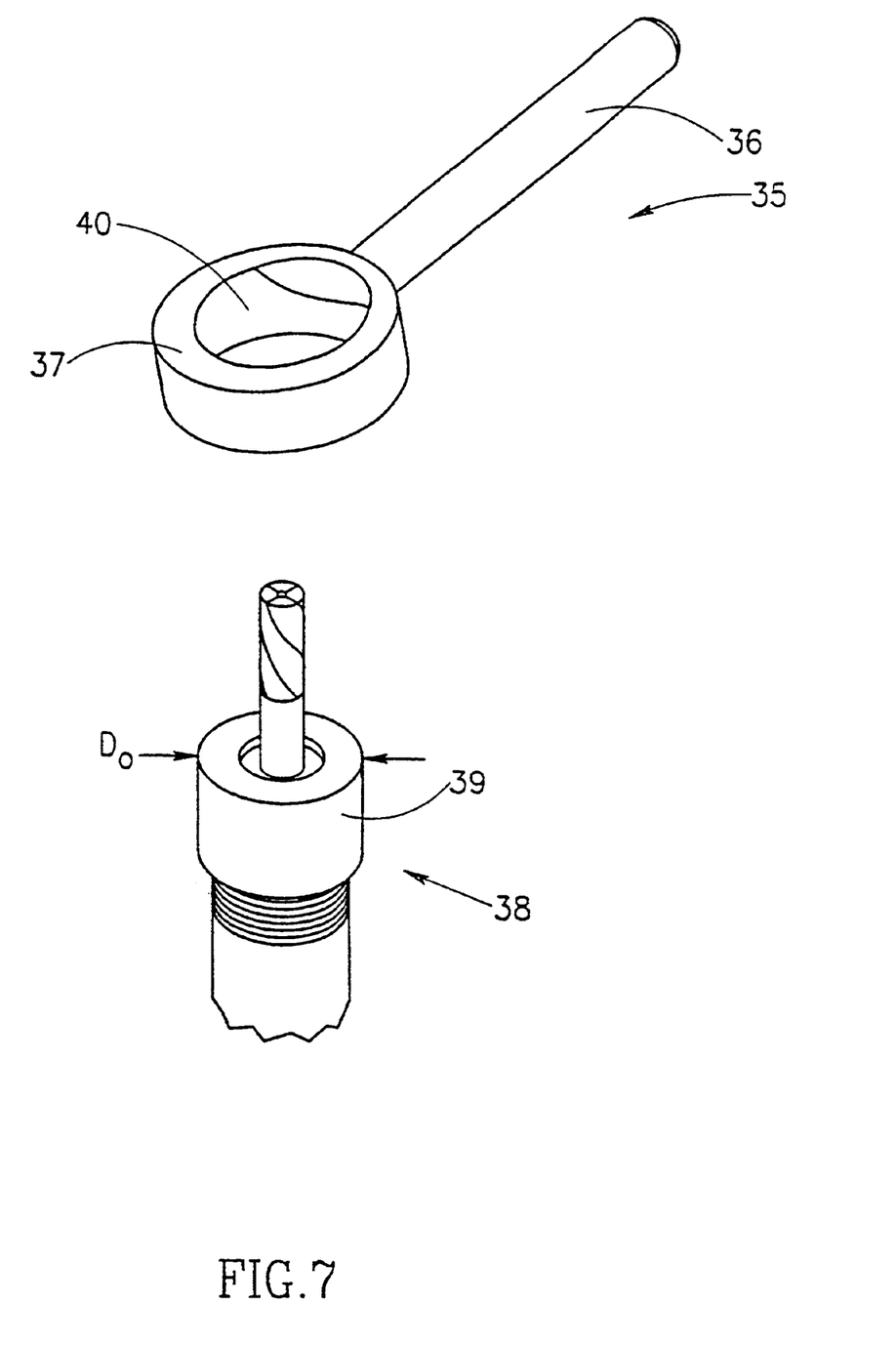
FIG. 7 is a perspective view of a part of a toolholder and a wrench for releasing and tightening a clamping nut of the toolholder.
Figure 8:
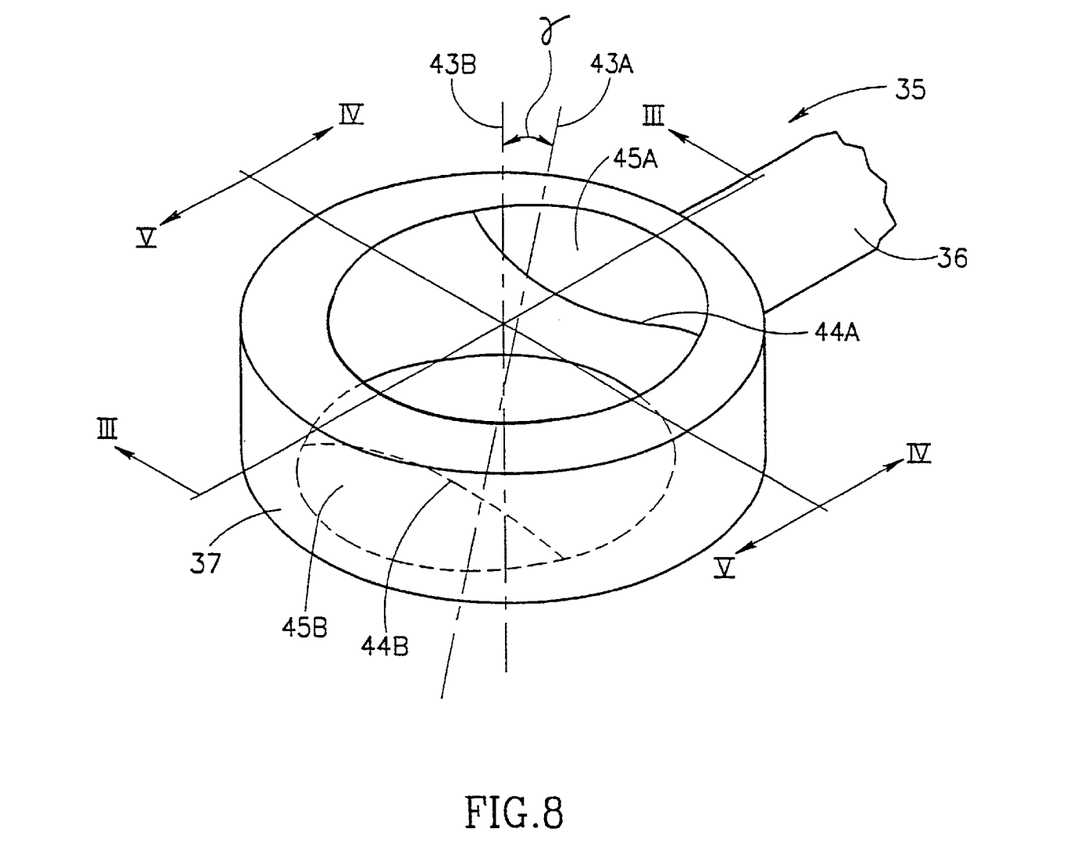
FIG. 8 is a perspective view of the wrench of FIG. 7.
Figure 9A:
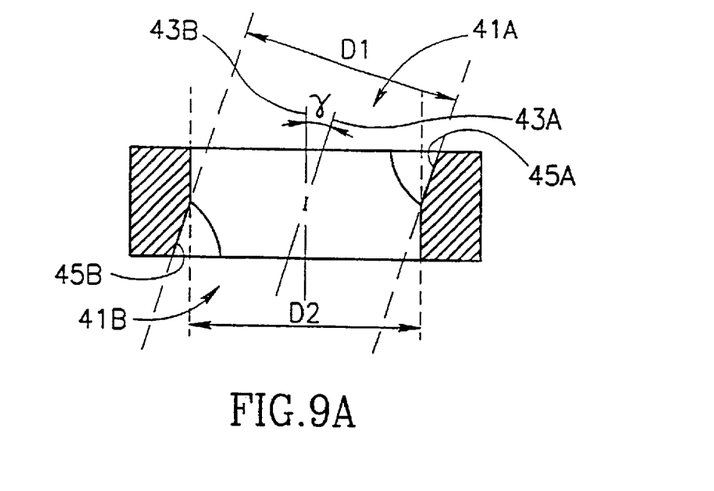
FIGS. 9A–9C are respectively longitudinal cross sectional views of the wrench of FIG. 7 along lines III—III, IV—IV and V—V respectively in FIG. 8.
Figure 9B:
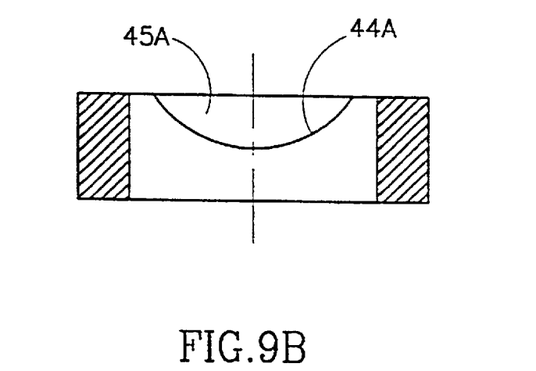
Figure 9C:
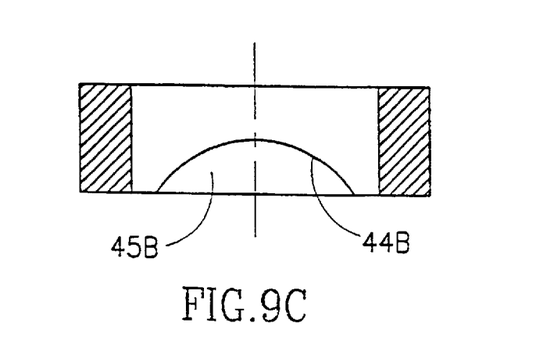

With reference now to FIGS. 4–6, there is shown a side lock toolholder 25 (constituting a clamping device) of a two-piece construction with an outer tubular portion 25A and an inner tubular core portion 25B formed with an insertion bore 26 for releasably clamping a cutting tool 27 (constituting an insertion member) having a right circular cylindrical shank 28 by means of a transversely directed clamping screw 29 bearing thereagainst. The portions 25A and 25B are made of different materials so as to substantially dampen tool chatter, for example, the portion 25A can be made from steel whilst the portion 25B can be made from cast iron.

The insertion bore 26 is similar to the insertion bore 15 in that it is formed by the union of an access bore portion 31A and a gripping bore portion 31B respectively having longitudinal axes 32A and 32B parallel and offset to one another (see FIGS. 5 and 6). However, since the insertion bore 26 is closed at one end, its open end is more susceptible to forced expansion than its closed end such that if gripping bore portion 31B is cylindrical in shape, then the gripping force as imparted thereby would not be uniform. In order to ensure that the right circular cylindrical shank 28 is gripped uniformly along the entire length of the gripping bore portion 31B, the gripping bore portion 31B has, instead of a cylindrical shape, a right circular frusto-conical shape. The cross-section of the gripping bore portion 31B, taken perpendicular to the axis 32B, is greater at its closed end than at its open end. The inner surfaces of the respective access and gripping bore portions 31A and 31B, intersect at junction fines 33A and 33B. By means of the frusto-conical shape described above, the same gripping capability is achieved along the entire length of the gripping bore portion, such that its clamping surface 33 has an equal arc angle at both ends when the cutting tool 27 is clamped in the gripping bore portion 31B.

The use of the toolholder 25 for clamping a cutting tool 27 is similar to that of the toolholder clamp fixture 1. By way of example, a toolholder 25 for use with a cutting tool 27 having a shank diameter $D_0$=20.00 mm has an insertion bore 26 defined by the following insertion bore triplet $D_1$=20.07 mm, $D_2$=19.985 mm to $D_2$=19.995 mm, $D_3$=1 mm. In this case, when the cutting tool 27 is clamped in the gripping bore portion 31B, the arc angle of the clamping surface 33 is about 181° at both ends of the gripping bore portion 31B.

With reference now to FIGS. 7–11, a wrench 35 (constituting a clamping device) includes an elongated arm 36 terminating in a wrench head 37 adapted for releasing and tightening a right circular cylindrical clamping nut 39 (constituting a shank portion) of diameter $D_0$ of a toolholder 38 (constituting an insertion member). The wrench head 37 has an insertion bore 40 formed by the union of a right circular cylindrical gripping bore portion 41B of diameter $D_2$ and an inclined circular cylindrical access bore portion 41A of diameter $D_1$ whereby their respective longitudinal axes 43B and 43A define an inclination angle γ (see FIGS. 8 and 9A) therebetween. The longitudinal axes 43A and 43B intersect at the midpoints of the respective access bore portion 41A and the gripping bore portion 41B such that their surfaces intersect at a pair of crescent shaped junction lines 44A and 44B thereby defining a pair of crescent shaped surfaces 45A and 45B of the access bore portion 41A.

Figure 10A:
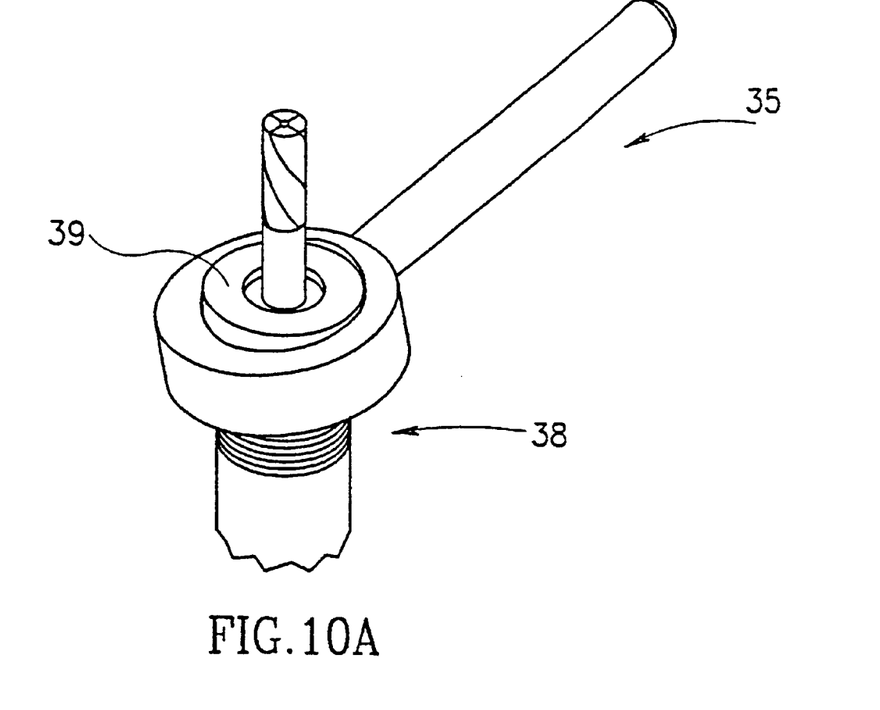
FIGS. 10A and 10B are respectively perspective and longitudinal cross sectional views of the wrench and toolholder of FIG. 7 with the toolholder in its initial insertion position.
Figure 10B:
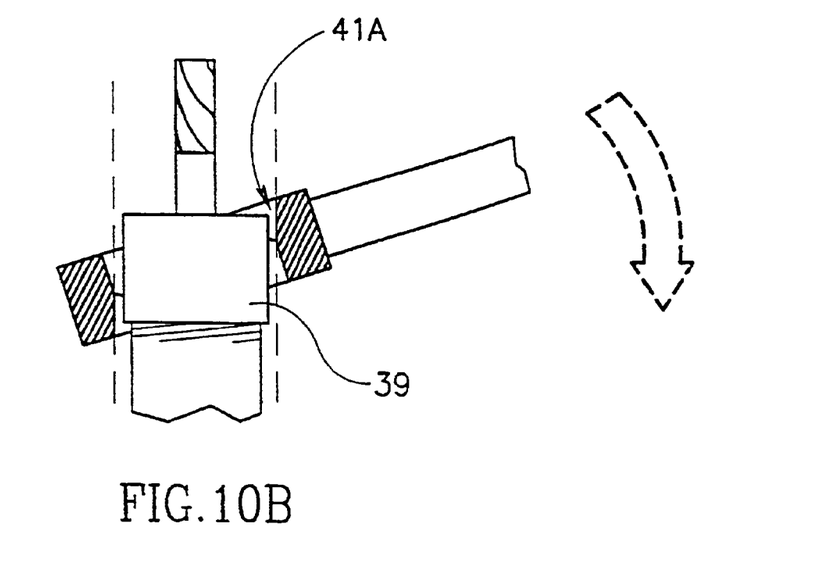
Figure 11A:
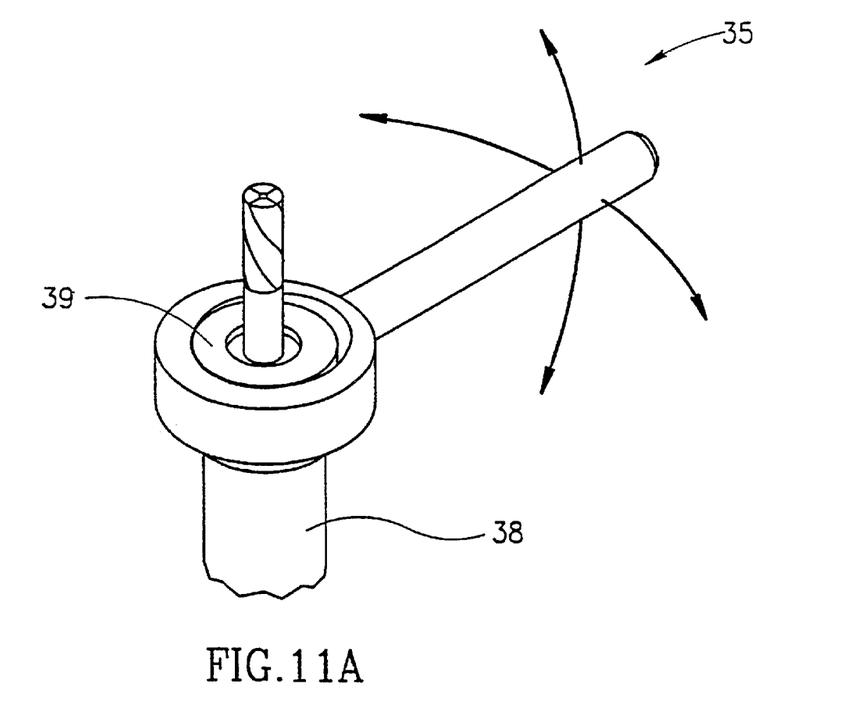
FIGS. 11A and 11B are respectively perspective and longitudinal cross sectional views of the wrench and toolholder of FIG. 7 with the toolholder in its subsequent clamped position.
Figure 11B:
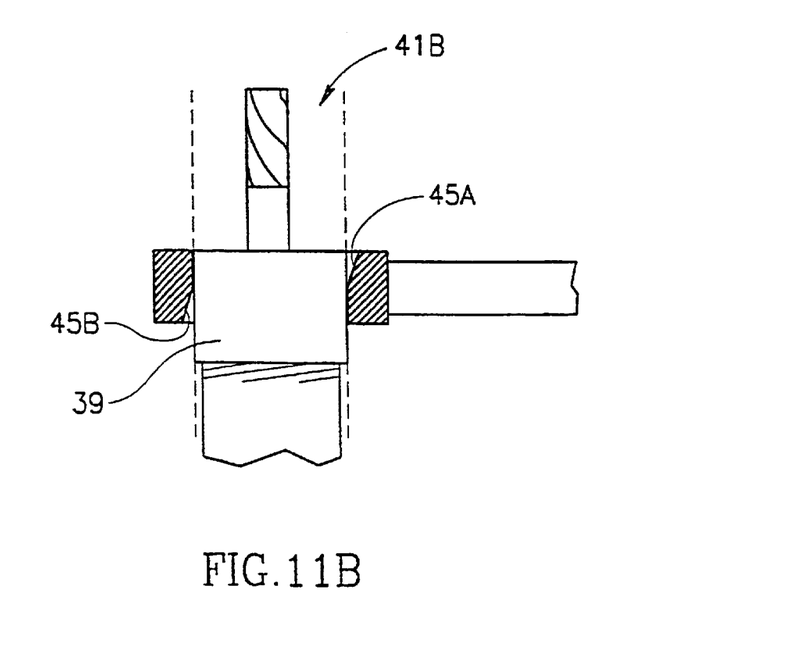

In use, the wrench 35 is initially inclined relative to a vertically held toolholder 38 so that it can be slid thereonto so that the clamping nut 39 is nested within the access bore portion 41A (see FIGS. 10A and 10B). Thereafter, the wrench 35 is rotated clockwise, as shown by the dashed arrow in FIG. 10B, relative to the toollholder 38 to forcibly insert the clamping nut 39 into the gripping bore portion 41B, thereby clamping the wrench 35 on the clamping nut 39. In this position, the wrench 35 is rotated around the axis 43B thus releasing the clamping nut 39 (see FIGS. 11A and 11B). A worn cutting tool can then be replaced by a new cutting tool and the clamping nut 39 is tightened by a counter direction rotation of the wrench 35 relative to the toolholder 38 around the axis 43B. Upon re-tightening the clamping nut 39, the wrench 35 is counter clockwise rotated in a direction opposite to that shown by the dashed arrow in FIG. 10B. As a result, the contact between the clamping nut 39 and the gripping bore portion 41B is released and the wrench 35 can be upwardly removed from the toolholder 38.

Various modifications and changes may be made in the configuration described above that come within the spirit of the invention. The invention embraces all such changes and modifications coming within the scope of the appended claims. For example, the longitudinal axes of an insertion bore's access bore portion and gripping bore portion do not have to lie on a single plane as long as an insertion member can be displaced therebetween.

Figure 12A:
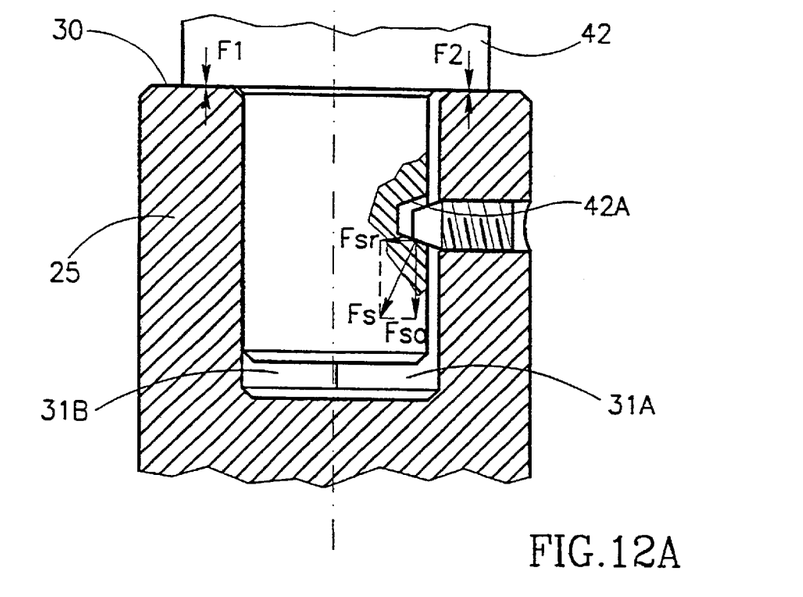
FIGS. 12A and 12B are longitudinal cross sectional views of a side lock toolholder taken along a line II—II of FIG. 4 for radially and axially clamping a toolholder.
Figure 12B:
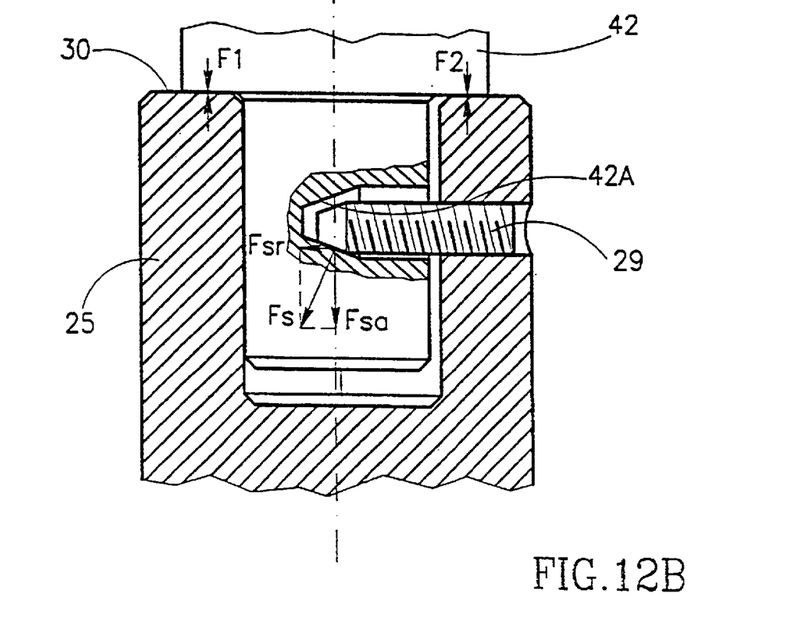

In addition, as shown in FIGS. 12A and 12B, a side lock toolholder 25 is used with a cutting tool 42 formed with a recess 42A having an inclined surface engaged by the toolholder's clamping screw 29 for simultaneously forcibly displacing the cutting tool 42 from its access bore portion 31A to its gripping bore portion 31B, by means of the radial component $F_{ST}$ of the screw's clamping force $F_S$, whilst axially urging the cutting tool 42 against the toolholder's leading abutment surface 30, by means of the axial component $F_{sa}$ of the screw's clamping force $F_S$, thereby securely clamping the cutting tool 42. The recess 42A can be either relatively shallow (see FIG. 12A) whereby $F_2 > F_1$ suitable, for example, for a turning cutting tool or, relatively deep (see FIG. 12B) whereby $F_2 = F_1$ suitable, for example, for a drilling or a milling cutting tool, where $F_1$ and $F_2$ are the axial abutting forces.

What is claimed is:

1. A tool assembly comprising:

a tool holder comprising a shank portion having a diameter D0 along a first portion thereof; and a clamping member having an insertion bore formed by the union of an access bore portion and a gripping bore portion, wherein:
  said access bore portion has a circular cross section with diameter D1 in a transverse cross sectional view of said clamping member;
  said gripping bore portion has a circular cross section with diameter D2 in said transverse cross sectional view of said clamping member, the gripping bore portion having an arcuate clamping surface with an arc angle greater than 180°;
  said access bore portion and said gripping bore portion have longitudinal axes spaced apart at least along a portion thereof; and
  the tool assembly is movable between a disassembled position in which the tool holder's shank portion and the arcuate clamping surface are separated, and an assembled position in which the tool holder's shank portion is in abutment with the arcuate clamping surface.

2. The tool assembly according to claim 1, wherein D1>D0>D2.

3. The tool assembly according to claim 1, wherein said longitudinal axes define a single plane.

4. The tool assembly according to claim 3, wherein said access and gripping bore portions each have a right circular shape.

5. The tool assembly according to claim 3, wherein said access bore portion has right circular cylindrical shape and said gripping bore portion has right circular frusto-conical shape.

6. The tool assembly according to claim 1, wherein said longitudinal axes are inclined to another one.

7. The tool assembly according to claim 6, wherein said access bore portion has an inclined circular cylindrical shape and said gripping bore portion has a right circular cylindrical shape.

8. The tool assembly according to claim 1, wherein said clamping member includes an outer tubular portion and an inner tubular core portion formed with said insertion bore and wherein said outer and inner portions are made from different materials.

9. The tool assembly according to claim 1, further comprising a leading abutment surface for axially supporting the tool holder, and a clamping screw for engaging an inclined surface of the tool holder for simultaneously forcibly displacing the tool holder from said access bore portion to said gripping bore portion and axially urging the tool holder against said leading abutment surface.

10. A tool assembly comprising:
  a tool holder comprising a shank portion having a diameter D0 along a first portion thereof; and
  a clamping member having an insertion bore formed by the union of an access bore portion and a gripping bore portion, wherein:
    said access bore portion has a circular cross section with diameter D1 in a transverse cross sectional view of said clamping member;
    said gripping bore portion has a circular cross section with diameter D2 in said transverse cross sectional view of said clamping member, the gripping bore portion having an arcuate clamping surface;
    said access bore portion and said gripping bore portion have longitudinal axes spaced apart at least along a portion thereof;
    D1>D0>D2;
    the tool assembly is movable between a disassembled position in which the tool holder's arcuate shank portion and the arcuate clamping surface are separated, and an assembled position in which the tool holder's arcuate shank portion is in abutment with the arcuate clamping surface, upon forced displacement of the tool holder's arcuate shank portion from the access bore portion into the gripping bore portion; and
    wherein said clamping member includes an outer tubular portion and an inner tubular core portion formed with said insertion bore and wherein said outer and inner portions are made from different materials.

11. The tool assembly according to claim 10, wherein the clamping surface has an arc angle greater than 180°.

12. The tool assembly according to claim 10, wherein said longitudinal axes define a single plane.

13. The tool assembly according to claim 12, wherein said access and gripping bore portions each have a right circular shape.

14. The tool assembly according to claim 10, further comprising a leading abutment surface for axially supporting the tool holder, and a clamping screw for engaging an inclined surface of the tool holder for simultaneously forcibly displacing the tool holder from said access bore portion to said gripping bore portion and axially urging the tool holder against said leading abutment surface.

15. A tool assembly comprising:
  a tool holder comprising a shank portion having a diameter D0 along a first portion thereof; and
  a clamping member having an insertion bore formed by the union of an access bore portion and a gripping bore portion, wherein:
    said access bore portion has a circular cross section with diameter D1 in a transverse cross sectional view of said clamping member;
    said gripping bore portion has a circular cross section with diameter D2 in said transverse cross sectional view of said clamping member, the gripping bore portion having an arcuate clamping surface;
    said access bore portion and said gripping bore portion have longitudinal axes spaced apart at least along a portion thereof;
    D1>D0>D2;
    the tool assembly is movable between a disassembled position in which the tool holder's arcuate shank portion and the arcuate clamping surface are separated, and an assembled position in which the tool holder's arcuate shank portion is in abutment with the arcuate clamping surface, upon forced displacement of the tool holder's arcuate shank portion from the access bore portion into the gripping bore portion;
    said longitudinal axes define a single plane; and
    said access bore portion has right circular cylindrical shape and said gripping bore portion has right circular frusto-conical shape.

16. A tool assembly comprising:
  a tool holder comprising a shank portion having a diameter D0 along a first portion thereof; and
  a clamping member having an insertion bore formed by the union of an access bore portion and a gripping bore portion, wherein:
    said access bore portion has a circular cross section with diameter D1 in a transverse cross sectional view of said clamping member;
    said gripping bore portion has a circular cross section with diameter D2 in said transverse cross sectional view of said clamping member, the gripping bore portion having an arcuate clamping surface;

said access bore portion and said gripping bore portion have longitudinal axes spaced apart at least along a portion thereof;

$D1>D0>D2$;

the tool assembly is-movable between a disassembled position in which the tool holder's arcuate shank portion and the arcuate clamping surface are separated, and an assembled position in which the tool holder's arcuate shank portion is in abutment with the arcuate clamping surface, upon forced displacement of the tool holder's arcuate shank portion from the access bore portion into the gripping bore portion; and said longitudinal axes are inclined to one another.

17. The tool assembly according to claim 16, said access bore portion has an inclined circular cylindrical shape and said gripping bore portion has a right circular cylindrical shape.

18. A tool assembly comprising:

a clamping member having an insertion bore formed by the union of an access bore portion and a gripping bore portion, wherein:

said access bore portion has a circular cross section with diameter $D1$ in a transverse cross sectional view of said clamping member;

said gripping bore portion has a circular cross section with diameter $D2$ in said transverse cross sectional view of said clamping member, the gripping bore portion having an arcuate clamping surface having an arc angle greater than 180°; and $D1>D2$.

19. The tool assembly according to claim 18, further comprising:

a tool holder having a shank portion having a diameter $D0$ with $D1>D0>D2$; and wherein the tool assembly is movable between a disassembled position in which the tool holder's shank portion and the arcuate clamping surface are separated, and an assembled position in which tool holder's shank portion is in abutment with the arcuate clamping surface, upon forced displacement of the tool holder's shank portion from the access bore portion into the gripping bore portion.

* * * * *